May 14, 1968   F. CIEMNIAK ET AL   3,383,566
DIODE CONTROL OF VOLTAGE IN AN EXPOSURE CONTROL CIRCUIT
Filed Dec. 2, 1964

Inventors:
Felix Ciemniak
Willam A. Johnson
By Barry L. Clark
John E. Peele Jr.   Attys.

United States Patent Office 3,383,566
Patented May 14, 1968

3,383,566
DIODE CONTROL OF VOLTAGE IN AN
EXPOSURE CONTROL CIRCUIT
Felix Ciemniak, Chicago, and William A. Johnson, Hoffman Estates, Ill., assignors to Bell & Howell Company, Chicago, Ill., a corporation of Illinois
Filed Dec. 2, 1964, Ser. No. 415,533
2 Claims. (Cl. 317—123)

ABSTRACT OF THE DISCLOSURE

A voltage regulating system for use in a motion picture camera having an electrically energized exposure control system and an electrically energized mechanism drive, both powered by a single, variable low voltage power supply. The regulating system keeps constant the voltage applied to the exposure control system, and includes in parallel circuit with the exposure control system, a plurality of solid state devices operable at the low voltages used with minimum battery drain.

---

The instant invention relates to a motion picture camera and particularly to a voltage control circuit for obtaining uniformity of voltage from a variable voltage power supply for application to the exposure control system of the camera.

Some of the latest advances in photography have related to improvements in the exposure control system of motion picture cameras. The various types of automatic exposure control systems employ at least one galvanometer. Most require some type of electrical power supply when a photo resistive element such as a cadmium sulfide type photoresistor is used. Although the present invention is applicable to any present day single or double coil galvanometer circuit, it has particular utility in connection with single coil meters, the accuracies of which are subject to substantial variation in some circuit arrangements as the voltage supply varies. The variations arise from the fact that meters conventionally have springs which serve both to carry current to the coil and as a biasing means supplying a torque tending to rotate the coil of the galvanometer in one direction. The spring torque is opposed by the torque generated by the current passing through the coil. This latter torque varies due to the resistance variations of the photoresistor because of the variations of light impinging thereon. Balance is obtained when the coil rotates an amount necessary to balance the spring generated torque against the electrically generated torque. The initial adjustment of the exposure control system is usually made when the battery is providing a relatively high level of voltage, usually the voltage from a new battery. A drop in the voltage output occurs over the life of the usual battery such as the dry cell type as the battery ages or is used. Such a voltage drop will cause the galvanometer to control the iris blades of the camera in an erroneous manner such that the film will be overexposed since the torque applied to the coil against the spring for a given light condition will be less than the torque for which the system was initially adjusted. Thus, it is desirable to have a means to apply to the galvanometer and the exposure control system generally a continuously stable voltage throughout the life of the battery.

With particular reference to electric drive cameras, it is conventional to have two types of batteries to drive the motor of the camera and to power the exposure control system. The motor drive battery pack is usually of the well known dry cell type in which the voltage supplied will vary from about six volts, for example when the battery is new, down to approximately four volts when the batteries must be discarded. A mercury cell is commonly used in the meter circuit to provide a constant level voltage output. However, mercury cells are relatively expensive although they do have a relatively long life, normally about one year. Usually, battery test equipment, either built into the camera or external thereto, is used to test only the motor drive battery and does not indicate to the operator the condition of the meter battery. As voltage of the meter battery eventually drops due to decay through use, storage and the like, the exposure control system will operate with a constantly increasing error which will normally not be immediately recognized by the camera operator. Thus, it is desirable to provide a simple, trouble-free voltage regulating circuit which may be incorporated in the exposure control system to enable the system to obtain a stable voltage from the more economical but variable motor drive power source of the camera.

An object of the present invention is to provide a novel voltage control circuit to provide a uniform voltage to the exposure control system to enable the use of inexpensive camera drive batteries having a varying voltage.

Another object of the present invention is to provide a circuit in which at least one diode is used to control the voltage supplied to the exposure control system so as to apply a constant voltage level to the system.

Still another object of the present invention is to provide a novel, and economical circuit for supplying to a camera exposure control system a constant voltage from a variable voltage source, such circuit including at least one diode; a characteristic of the circuit being that the level of voltage obtained from the variable voltage source is below the minimum operating voltage necessary for operation of the drive motor of the camera but is above the level required by the exposure control system.

Further objects of the invention will appear from the description as hereinafter set forth in connection with the appended claims and the accompanying drawings wherein:

FIG. 1A discloses a conventional motor control circuit in a camera.

FIG. 1B discloses the exposure control system circuit in the same camera.

FIG. 2 discloses a drive motor-exposure control system circuit of the preferred embodiment.

Figure 1A:
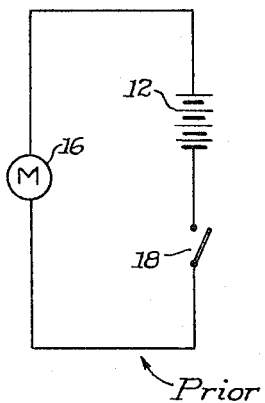

In FIG. 1A is a "conventional" type electrical circuit in a motion picture camera in which a dry cell power supply 12 is connected in series circuit with a driving motor 16 of the camera. A start button 18 controls the operation of the motor by opening and closing the circuit at the option of the camera operator.

Figure 1B:
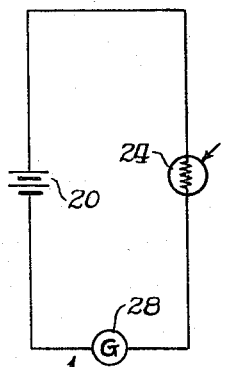

FIG. 1B shows a separate meter circuit having a mercury battery 20. The mercury meter battery 20 is connected in series with a light sensitive element 24 and a galvanometer 28. A comparison of the circuits of FIGS. 1A and 1B shows that the battery power supply for motor circuit has no connection with the battery power supply for the meter circuit. When the motor battery 12 has decayed because of use or storage, it is changed to obtain improved performance, i.e. proper speed and torque requirements of the drive motor. The operator will probably not change meter battery 20 until it becomes apparent that the battery is substantially completely depleted. Although the meter battery has a relatively long life, the eventual decay and use of the battery will cause less than desirable sensitivity of the meter circuit resulting in inaccurate exposure of the film in the camera.

Figure 2:
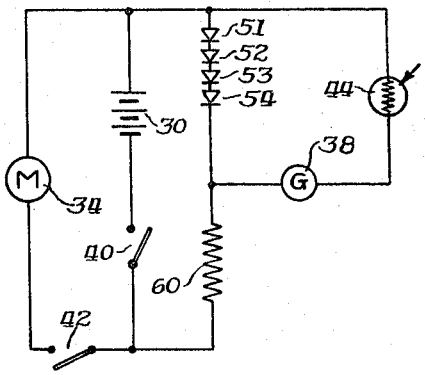

In FIG. 2 is disclosed a preferred embodiment of the present invention using a single power source, such as a battery 30, which may be one or more cells of the dry cell type. The battery is in a circuit tto provide current for the camera drive motor 34 and to cause the voltage to be applied across a portion of the circuit defined as a meter loop which includes a meter 38. A camera control switch 40 actuated by a start button (not shown) is located in the portion of the circuit defined as a power loop to permit the motor 34 to be selectively actuated. A master on-off switch 42 separate from the camera control switch is also preferably in the circuit to preserve the battery from undesirable drain from continuous connection in the exposure control during long periods of storage.

In the meter loop of the circuit and in series with the meter 38 is a light sensitive element, such as photoresistor 44, on which light reflected from the subject to be photographed impinges to cause variations in the amount of current passed to the meter 38. The photoresistor element 44 has a varying resistance which increases or decreases when the quantity of light impinging thereon decreases or increases respectively. The current flowing through said element causes the coil (not shown) of the galvanometer 38 to rotate due to the torque generated by the current flow in the magnetic field of the galvanometer. The torque and therefore the resulting rotation of the coil is proportional to the current flowing through the coil. The rotation of the coil moves a diaphragm blade or blades (not shown) to which it is operably connected. The rotation of the blade or blades alters the quantity of light impinging upon film in the camera to provide proper exposure thereof.

In this embodiment, a plurality of diodes 51, 52, 53, 54 preferably of the silicon rectifier type, are in series connection in the power supply loop containing the battery 30 and a current limiting resistor 69. The meter loop is connected in parallel circuit with the diode portion of the power supply loop which supplies the meter loop with an essentially constant voltage. Thus, the voltage affecting the meter is always regulated to an essentially uniform level and inaccuracies resulting from voltage variations are greatly reduced.

In this typical circuit, the value of the current limiting resistor is 150 ohms. Assuming typical meter and photoresistor characteristics when operated at 2.8 volts, the resulting steady state current through the meter loop is approximately 50 microamperes. This current is extremely small when compared to the current in the power supply loop, which latter current is in the range of 1 to 50 milliamperes, depending upon the degree of regulation required. Thus, the meter loop causes negligible loading of the power supply loop and the regulated voltage is determined almost entirely by the diode forward voltage versus current characteristic.

Although the diodes may have favorable reverse drop characteristics, these characteristics are not taken advantage of. Therefore, diodes may be used which are of less than best quality in the reverse characteristics. The use of such imperfect diodes, results in economic savings with no loss in performance in the instant application. The independent voltage characteristic of each diode and similarly the total voltage across the several diodes can be selected to suit specific requirements as the diodes are available with various forward voltage drop characteristics. In the instant embodiment, the diodes are such that with a desired current flow in the forward direction, there will be .7 volt across each diode. When more than a single diode are used, they are connected in series to obtain the sum of the voltages across the individual elements. In the desired operating range, a relatively large percentage change in current through the diode causes a relatively small change in voltage across the diode. Thus, although the varying voltage of the battery will cause a current change in the diode, the voltage across the diode will be relatively insensitive to such changes.

Figure 3:
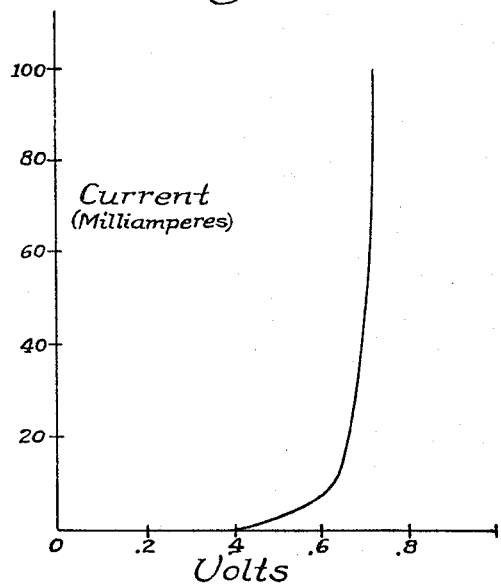
FIG. 3 is a current versus voltage output graph of a typical diode of the type contemplated in the present invention.

From FIG. 3 it is seen from the current vs. voltage graph of a typical diode of the preferred type that as the current varies over a range of approximately 5 to 50 milliamperes the voltage varies only over a range of .5 to .7 volt. Thus, it is seen the voltage output changes by a factor of only 1.4 while the current changes by a factor of 10.

Figure 4:
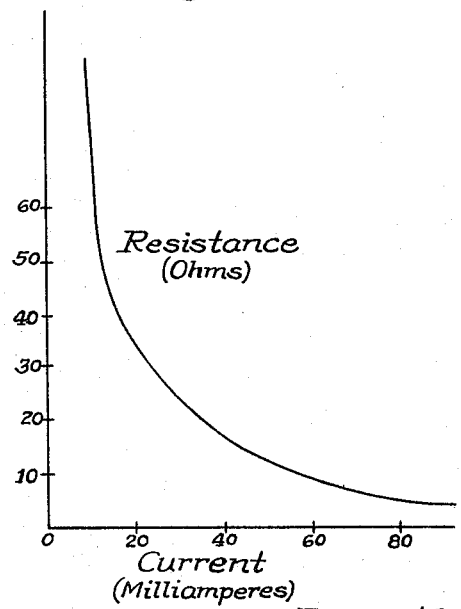
FIG. 4 is a resistance versus current graph of the same typical diode.

The resistance vs. current graph of the same typical diode (see FIG. 4) is a curve taken in the diode operating region at about .7 volt. As the current through the diode increases, the resistance decreases. The characteristics of the diode are thus shown to permit the current flow to approach the maximum available as the voltage is maintained at a desired uniformity, although the available voltage and/or current from the power source is non-uniform.

When a new battery 30 is inserted into the circuit in the camera, it will be rated at 6 volts, for example. This voltage will drop over a period of time because of use, decay or storage to a point at which the camera drive motor performance is below minimum requirements. In this example, this level is reached when the battery has deteriorated to 4 volts. Because the rate of operation of the drive motor is desirably selectively governed by known elements (not shown), there will be no change in the normal operational rate of the drive motor as the battery decays as long as it remains above the minimum 4 volts. However when the battery produces less than 4 volts as can be determined by either a built-in or external battery tester, it should be replaced to maintain the minimum performance requirements which the camera is expected to have.

As indicated, the particular diodes 51, 52, 53, 54, though reversible in terms of voltage applied are used only with respect to their forward voltage drop characteristic. In this particular type of diode, as the current flow increases above a minimum value, the resistance decreases in a manner to maintain the desired approximately .7 volt. The voltage across the diode rapidly reaches approximately .7 volt and will vary little although the current or voltage of the source may vary. Thus, the total voltage across the four diodes in series will be kept essentially constant at an approximate level of 2.8 volts irrespective of the voltage supplied to the circuit by the battery as long as that voltage output exceeds 2.8 volts. Since the battery will normally not be used after dropping below 4 volts, an adequate power supply is always maintained and the exposure control system is therefore maintained at peak accuracy.

It is to be understood that modifications and variations may be effected without departing from the scope of the novel concepts of the present invention.

We claim as our invention:

1. A voltage control circuit for applying to an exposure control system in a camera adapted to be moved a uniform voltage output from a low voltage, low current battery source supplying a relatively non-uniform voltage output comprising:

a first loop including said battery source;

current limiting means in series connection with said battery source;

at least two silicon rectifier means in series connection with said battery source and said current limiting means, said rectifiers having an additive voltage effect wherein each of said rectifiers limits the voltage appearing at its terminals when excess voltage is supplied thereto; and a second loop including photoresistor means to vary the current flow through said second loop in accordance with the quantity of light impinging on said photoresistor means and meter means in series connection with said photoresistor means;

said second loop being in parallel connection with said silicon rectifiers in said first loop;

whereby when said voltage from said battery source is in excess of that level to be applied to said second loop, said voltage across said silicon rectifiers is maintained uniform at that level by said silicon rectifiers.

2. An exposure control system power supply voltage uniformity control circuit for use in a motion picture camera having a low voltage, low current, battery power source with a relatively non-uniform voltage output, the exposure control system being powered by a said power source, the circuit comprising:

a first loop operating as a voltage regulator loop and including said power source;

a current limiting resistor in series connection with said power source;

a plurality of silicon diodes in series connection with said power source and said current limiting resistor wherein said voltage output from said power source in said first loop is regulated to a uniform voltage by said diodes; and a second loop of said circuit in parallel with said diodes in said first loop;

said second loop including a photoresistor element and a galvanometer element cooperating to vary the passage of current through said second loop, said elements being in parallel connection with the diodes in said first loop and being subject to modified operation by variations in their voltage supply;

whereby so long as said voltage from said power source in said first loop remains above the level of the voltage required in said second loop, said voltage to said second loop at the said level is maintained essentially constant by said diodes.

References Cited

UNITED STATES PATENTS 2,032,455   3/1936   Williams _____ 324—63 X

LEE T. HIX, *Primary Examiner.*